(No Model.)

L. W. JOHNSON.
DEVICE FOR TEACHING FRACTIONS AND PERCENTAGE.

No. 383,300. Patented May 22, 1888.

Witnesses,
R. A. Balderson.
F. C. Killigan.

Inventor,
Louis W. Johnson.
By L. Bingham.
His Attorney.

UNITED STATES PATENT OFFICE.

LOUIS WALTER JOHNSON, OF SPENCER, MISSOURI.

DEVICE FOR TEACHING FRACTIONS AND PERCENTAGE.

SPECIFICATION forming part of Letters Patent No. 383,300, dated May 22, 1888.

Application filed February 24, 1888. Serial No. 265,117. (No model.)

*To all whom it may concern:*

Be it known that I, LOUIS WALTER JOHNSON, a citizen of the United States of America, residing at Spencer, in the county of Lawrence and State of Missouri, have invented certain new and useful Improvements in the Octagon Fractional Percentage-Wheel, of which the following is a specification, reference being had therein to the accompanying drawings.

My invention relates to educational charts; and its objects are, first, to easily explain the relation between fractions and percentage; second, to assist the youthful comprehension as to the interchangeability of fractions with percentage; third, to induce an ineffaceable mental impression by ocular demonstration of the correlation of fractions with percentage; fourth, to provide in small compendium a device readily illustrating the convertibility of fractions into percentage, and conversely, and, fifth, to secure these aims with simplicity and economy of structure. I attain these ends by the device illustrated in the accompanying drawings, in which—

Figure 1:
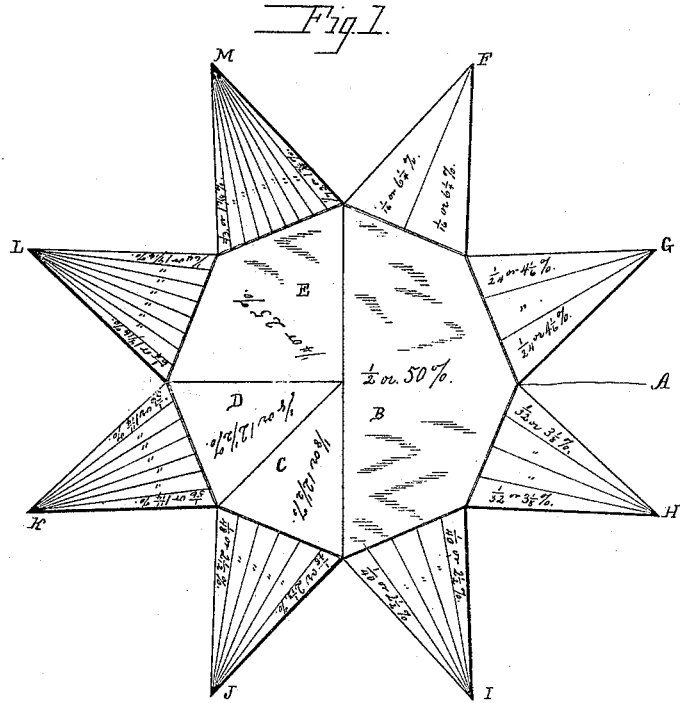
Figure 2:
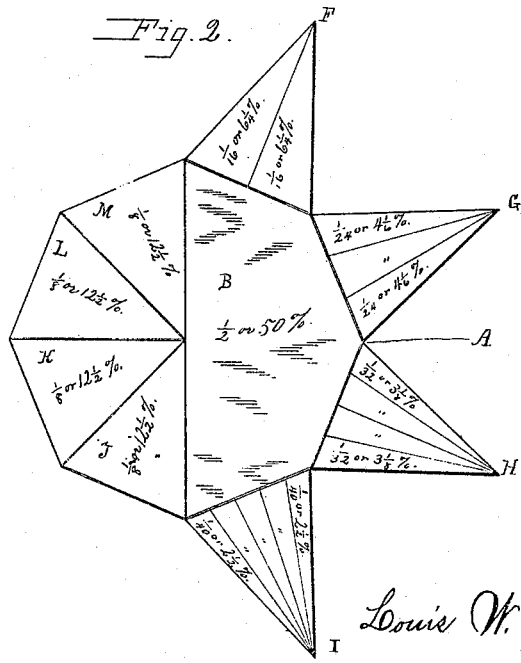

Figure 1 represents a plan view of a chart embodying the essential elements of my invention, and Fig. 2 is a similar view thereof, having one-half of the stellar wings closed, as they all normally are for convenience of portability.

The same designations indicate corresponding parts in both views.

The octagonal chart A has its surface laid out in parts B C D E, respectively one-half, one-eighth, and one quarter. Integrally with or attached by flaps to the chart are equal wings F G H I J K L M, whose areas are equal to those of the triangular spaces C D. The wing F is divided into equal triangles, whose value, obtained by addition, is twelve and one-half per cent. of the chart's area. The wing G is composed of three triangles, whose aggregate value is twelve and one-half per cent. Similarly, the wings H I J K L M are respectively divided into four, five, six, seven, eight, and nine triangles, but whose aggregate value in each case is twelve and one-half per cent., thus obtaining one hundred per cent. for all. By superposition it will be observed that the triangles C J and D K are equal in area. Now, in order to obtain the relative percentage of a given fraction, I open the normally-closed wings to the extent of the fraction called for. For example, one-half the surface of A, which is equal to B, would be fifty per cent., being the sum of the percentage values of the wings F G H I. If I desire to know the percentage of one-eighth of one-eighth of the surface A, I open the wing L and discover by one of the triangles there delineated one and nine-sixteenths per cent., equal to one sixty-fourth the surface.

It will be apparent that this ocular method of demonstrating the relationship between fractions and percentage will leave a durable impression on the youthful mind and affords an educational toy or factor of intrinsic value. It is, moreover, useful in the counting-house to assist rapid calculations, and is easily and cheaply producible. The view illustrates an octagonal figure; but it is obvious that a polygonal figure of any number of sides may in like manner and on the same principle be constructed.

Having thus fully described my improvement, what I desire to secure by Letters Patent of the United States is—

As a new article of manufacture, the chart herein described, consisting of a polygonal surface, A, divided into any number of fractional parts, and having radial wings F G, &c., laid off as illustrated, whose aggregate value in the form of percentage shall in each case equal that of any other wing, so that a fractional part of the surface A will be indicated in the form of percentage on the stellar wings radiating equally from the center of the polygon, for the purpose herein fully shown and described.

In testimony whereof I affix my signature in presence of two witnesses.

LOUIS WALTER JOHNSON.

Witnesses:
 FRANK NEICKEL,
 JACOB KORBA.